US009013723B2

(12) United States Patent
Imaizumi et al.

(10) Patent No.: US 9,013,723 B2
(45) Date of Patent: Apr. 21, 2015

(54) IMAGE PROCESSING SYSTEM, PORTABLE TERMINAL, INFORMATION PROCESSING APPARATUS, AND DISPLAY METHOD

(75) Inventors: Shoji Imaizumi, Shinshiro (JP); Katsuhiko Akita, Amagasaki (JP); Hiroki Tajima, Toyokawa (JP); Kenro Hama, Amagasaki (JP); Yuji Okamoto, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 154 days.

(21) Appl. No.: 13/549,725

(22) Filed: Jul. 16, 2012

(65) Prior Publication Data
US 2013/0021634 A1      Jan. 24, 2013

(30) Foreign Application Priority Data

Jul. 20, 2011     (JP) ................... 2011-158973

(51) Int. Cl.
*H04N 1/00*      (2006.01)
*G06T 11/00*     (2006.01)

(52) U.S. Cl.
CPC ............ *G06T 11/00* (2013.01); *H04N 1/00344* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 7,949,740 B2 | 5/2011 | Scrafford et al. | |
| 2004/0260803 A1* | 12/2004 | Nakamura | 709/224 |
| 2008/0247767 A1* | 10/2008 | Scrafford et al. | 399/8 |
| 2009/0257083 A1 | 10/2009 | Ishikura | |
| 2012/0078686 A1* | 3/2012 | Bashani | 705/13 |

FOREIGN PATENT DOCUMENTS

| CN | 1780390 A | 5/2006 |
| CN | 101557450 A | 10/2009 |
| JP | 2005-311530 A | 11/2005 |
| JP | 2006-039912 A | 2/2006 |
| JP | 2008-257729 A | 10/2008 |
| JP | 2008-287501 A | 11/2008 |
| JP | 2010-3190 A | 1/2010 |
| JP | 2010-067093 A | 3/2010 |

OTHER PUBLICATIONS

Office Action (Notice of Grounds of Rejection) issued by the Japanese Patent Office on Dec. 3, 2013 in corresponding Japanese Patent Application No. 2011-158973 and an English translation of the Official Action. (7 pages).

Office Action from State Intellectual Property Office of People's Republic of China (SIPO) date Jun. 11, 2014, issued in corresponding Chinese Patent Application No. 201210247066.1, with English translation thereof. (25 pages).

\* cited by examiner

*Primary Examiner* — Saeid Ebrahimi Dehkordy
*Assistant Examiner* — Lennin Rodriguezgonzale
(74) *Attorney, Agent, or Firm* — Buchanan Ingersoll & Rooney PC

(57) ABSTRACT

When a portable terminal shoots a photo of a plurality of image processing apparatuses, a maintenance order is decided based on the respective states of a plurality of image processing apparatuses in a shooting range of the portable terminal. A tag representing the maintenance order is combined with the shot image and displayed on the portable terminal.

13 Claims, 14 Drawing Sheets

FIG.9

| | | MFP1 | MFP2 | MFP3 | MFP4 |
|---|---|---|---|---|---|
| POSITIONAL INFORMATION | LATITUDE | ***** | ***** | ***** | ***** |
| POSITIONAL INFORMATION | LONGITUDE | ***** | ***** | ***** | ***** |
| COUNTER | COPY | 9744 | 3241 | 6200 | 8871 |
| COUNTER | SCAN | 6883 | 8474 | 2198 | 4492 |
| COUNTER | PRINT | 4451 | 5001 | 1899 | 6622 |
| COUNTER | FAX | 1950 | 8011 | 4933 | 6454 |
| JAM INFORMATION | DOCUMENT JAM | NORMAL | NORMAL | NORMAL | NORMAL |
| JAM INFORMATION | PAPER-FEED JAM | NORMAL | NORMAL | NORMAL | NORMAL |
| JAM INFORMATION | CONVEYANCE JAM | NORMAL | NORMAL | NORMAL | NORMAL |
| JAM INFORMATION | FIXING JAM | NORMAL | NORMAL | NORMAL | NORMAL |
| JAM INFORMATION | OUTPUT JAM | NORMAL | NORMAL | JAM OCCURS | NORMAL |
| JAM COUNTER | DOCUMENT JAM | 2 | 0 | 83 | 0 |
| JAM COUNTER | PAPER-FEED JAM | 25 | 26 | 49 | 84 |
| JAM COUNTER | CONVEYANCE JAM | 25 | 8 | 91 | 7 |
| JAM COUNTER | FIXING JAM | 60 | 95 | 66 | 22 |
| JAM COUNTER | OUTPUT JAM | 3 | 63 | 42 | 79 |
| TROUBLE INFORMATION | SCANNING | NORMAL | NORMAL | NORMAL | NORMAL |
| TROUBLE INFORMATION | PROCESS | NORMAL | NORMAL | NORMAL | NORMAL |
| TROUBLE INFORMATION | FIXING | NORMAL | NORMAL | NORMAL | TROUBLE |
| TROUBLE INFORMATION | HARDWARE | NORMAL | NORMAL | NORMAL | NORMAL |
| TROUBLE INFORMATION | ABNORMAL IMAGE | NORMAL | NORMAL | NORMAL | NORMAL |
| TROUBLE INFORMATION | CONTROL | NORMAL | NORMAL | NORMAL | NORMAL |
| TROUBLE INFORMATION | MECHANICS | NORMAL | NORMAL | NORMAL | NORMAL |
| TROUBLE COUNTER | SCANNING | 0 | 0 | 0 | 0 |
| TROUBLE COUNTER | PROCESS | 0 | 0 | 0 | 0 |
| TROUBLE COUNTER | FIXING | 0 | 0 | 0 | 6 |
| TROUBLE COUNTER | HARDWARE | 0 | 0 | 0 | 0 |
| TROUBLE COUNTER | ABNORMAL IMAGE | 0 | 0 | 0 | 0 |
| TROUBLE COUNTER | CONTROL | 0 | 0 | 0 | 0 |
| TROUBLE COUNTER | MECHANICS | 0 | 0 | 0 | 0 |
| OPERATION MODE | | NORMAL | NORMAL | PROVISIONAL RECOVERY | NORMAL |
| EMPTY | Y TONER | NORMAL | NORMAL | NORMAL | NORMAL |
| EMPTY | M TONER | NORMAL | NORMAL | NORMAL | NORMAL |
| EMPTY | C TONER | NORMAL | NORMAL | NORMAL | NORMAL |
| EMPTY | K TONER | NORMAL | NORMAL | NORMAL | NORMAL |
| LIFE | Y_IU | NORMAL | NORMAL | NORMAL | NORMAL |
| LIFE | M_IU | NORMAL | NORMAL | NORMAL | NORMAL |
| LIFE | C_IU | NORMAL | NORMAL | NORMAL | NORMAL |
| LIFE | K_IU | NORMAL | NORMAL | NORMAL | NEAR LIFE |
| LIFE | FIXING | NORMAL | NORMAL | NORMAL | NORMAL |
| TIME SINCE PREVIOUS VISIT | | 960 | 817 | 58 | 444 |
| NUMBER OF TIMES OF VISITS | | 44 | 60 | 82 | 34 |
| INSTALLATION DATE | | Y/M/D | Y/M/D | Y/M/D | Y/M/D |

FIG.10

```
TERMINAL A
(1) DISTANCE PRIORITY
(2) SERIOUSNESS PRIORITY
         · TROUBLE
         · LIFE
         · EMPTY
         · JAM
         · NEAR LIFE
         · NEAR EMPTY
(3) UTILIZATION PRIORITY
         · COPY COUNTER
         · PRINT COUNTER
         · SCAN COUNTER
         · FAX COUNTER
(4) MAINTENANCE FREQUENCY PRIORITY
         · NUMBER OF TIMES OF VISITS
         · TIME PERIOD SINCE LAST VISIT
         · INSTALLATION DATE
(5) PARTICULAR OPERATION MODE PRIORITY
    (PROVISIONAL RECOVERY)
(6) PART REPLACEMENT REQUIRED
(7) CLEANING REQUIRED
```

FIG.14

```
TERMINAL A
(1) DISTANCE PRIORITY
(2) SERIOUSNESS PRIORITY
            ·TROUBLE
            ·LIFE
            ·EMPTY
            ·JAM
            ·NEAR LIFE
            ·NEAR EMPTY
(3) UTILIZATION PRIORITY
            ·COPY COUNTER
            ·PRINT COUNTER
            ·SCAN COUNTER
            ·FAX COUNTER
(4) MAINTENANCE FREQUENCY PRIORITY
            ·NUMBER OF TIMES OF VISITS
            ·TIME PERIOD SINCE LAST VISIT
            ·INSTALLATION DATE
(5) PARTICULAR OPERATION MODE PRIORITY
    (PROVISIONAL RECOVERY)
(6) PART REPLACEMENT REQUIRED
(7) CLEANING REQUIRED
(8) EXCLUSIVE OPERATION PRIORITY
            ·NOT PHOTOGRAPHED BY
              OTHER'S CAMERA
            ·DISTANT FROM OTHER'S
              CAMERA
```

IMAGE PROCESSING SYSTEM, PORTABLE TERMINAL, INFORMATION PROCESSING APPARATUS, AND DISPLAY METHOD

This application is based on Japanese Patent Application No. 2011-158973 filed with the Japan Patent Office on Jul. 20, 2011, the entire content of which is hereby incorporated by reference.

BACKGROUND OF THE INVENTION

1. Field of the Invention

The present invention relates to an image processing system, a portable terminal, an information processing apparatus, and a display method. More particularly, the present invention relates to an image processing system, a portable terminal, an information processing apparatus, and a display method, in which information related to maintenance of an image processing apparatus is processed.

2. Description of the Related Art

In office environments and the like, a plurality of image forming apparatuses (for example, copiers, printers, MFPs (Multi-Functional Peripherals), and the like) are often used in a certain extent. The kinds of these apparatuses often vary.

A serviceman visits a customer site with such a usage pattern to perform maintenance of a plurality of image forming apparatuses. Then, the serviceman decides the order of maintenance among a plurality of image forming apparatuses and performs maintenance in the decided order.

However, in the case where various kinds of image forming apparatuses are installed at the customer's site as described above, it may be difficult to check a status of each image forming apparatus and determine the maintenance order based on the proper priority. In particular, it is difficult to grasp the respective statuses of image forming apparatuses at the customer site that the serviceman visits for the first time. Therefore, the serviceman can determine the optimum order of priority only after collecting information in detail from the customer. As a result, the downtime of the image forming apparatuses as a whole at the customer site is increased, and the customer's convenience is impaired.

To cope with such a problem, for example, a method disclosed in Japanese Laid-Open Patent Publication No. 2008-287501 can be adopted. The publication above discloses a system in which image forming apparatuses used in a customer environment are grouped, the degree of urgency to be supported is determined for each group, and notification of the determination result is provided to a predetermined destination.

A mechanism such as remote diagnosis using a network may be used.

However, in some cases, one image forming apparatus requires different kinds of maintenance, or maintenance is concurrently performed on a plurality of image forming apparatuses. The method disclosed in the publication above cannot make a flexible determination in such cases.

In the case where a mechanism such as remote diagnosis using a network is used, network connection at a customer site is sometimes not permitted for the sake of security. In such a case, this mechanism cannot be used. Moreover, in this case, the serviceman has to carry a large-scale system, which is difficult to operate in terms of workload and cost.

SUMMARY OF THE INVENTION

The present invention is made to solve the problem described above. An object of the present invention is to provide an image processing system, a portable terminal, an information processing apparatus, and a display method, in which a plurality of image processing apparatuses can be maintained efficiently as a whole.

In order to achieve the object as described above, according to an aspect of the present invention, an image processing system includes: a portable terminal including a shooting unit and a display unit; a plurality of image processing apparatuses; and a server capable of mutually communicating with the portable terminal. Each of the plurality of image processing apparatuses includes a sensor for detecting a state of the image processing apparatus. The server includes a first acquisition unit for acquiring a detected value in the sensor as information of each of the plurality of image processing apparatuses. The server or the portable terminal includes a first processing unit for executing a process of deciding a maintenance order of the plurality of image processing apparatuses by referring to the information of each image processing apparatus. The portable terminal includes a second processing unit for executing a process of combining a shot image of the image processing apparatus obtained by shooting with the shooting unit, with an image representing the decided maintenance order, and displaying the combined image on the display unit.

Preferably, the server acquires positional information of the image processing apparatus as the information of each image processing apparatus using the first acquisition unit, and the server further includes a second acquisition unit for acquiring a position and an orientation of the portable terminal during shooting with the shooting unit. The first processing unit decides a maintenance order of image processing apparatuses present in a shooting range of the portable terminal, among the plurality of image processing apparatuses, by referring to the information of each image processing apparatus.

Preferably, the state of the image processing apparatus is represented by at least one of: counter information representing a number of times of image processing operations; information representing whether an error occurs in each unit; information representing history of errors; information representing whether part replacement is required; information about an operation mode; information representing frequency and history of maintenance; and information representing whether cleaning or check is required.

Preferably, the state of the image processing apparatus acquired by the first acquisition unit is a state concerning a plurality of items. The portable terminal further includes a setting unit for setting priorities of the items of the state of the image processing apparatus to be used to determine the maintenance order. The first processing unit decides a maintenance order of the plurality of image processing apparatuses according to the respective states of the plurality of image processing apparatuses that are represented by the items in accordance with the set priorities.

Preferably, the portable terminal further includes a display processing unit for changing a display manner of the image representing the maintenance order, according to the maintenance order.

According to another aspect of the present invention, a portable terminal includes a shooting unit, a display unit, and a display processing unit for performing a process of allowing the display unit to display a screen based on an image shot by the shooting unit. The display processing unit executes a process of combining a shot image obtained by shooting a plurality of image processing apparatuses with the shooting unit, with an image representing a maintenance order of the plurality of image processing apparatuses, and displaying the combined image on the display unit.

Preferably, the portable terminal further includes a detection unit for detecting a position and an orientation of the portable terminal during shooting with the shooting unit, and a request unit for transmitting a detection result in the detection unit to another apparatus to request information representing a maintenance order of the plurality of image processing apparatuses.

Preferably, the portable terminal further includes a detection unit for detecting a position and an orientation of the portable terminal during shooting with the shooting unit, a first acquisition unit for acquiring a state of the image processing apparatus, a second acquisition unit for acquiring a position of the image processing apparatus, and a decision unit for deciding a maintenance order of the plurality of image processing apparatuses, according to the state of the image processing apparatus shot by the shooting unit that is specified from a detection result in the detection unit and a position of the image processing apparatus.

According to a further aspect of the present invention, an information processing apparatus capable of communicating with a portable terminal includes: a first acquisition unit for acquiring, as a state of an image processing apparatus, a detected value in a sensor included in the image processing apparatus for detecting a state of the image processing apparatus; and a decision unit for deciding a maintenance order of a plurality of the image processing apparatuses by referring to the respective states of the image processing apparatuses.

Preferably, the portable terminal includes a shooting unit, and the information processing apparatus further includes: a second acquisition unit for acquiring a position of the image processing apparatus; and a third acquisition unit for acquiring a position and an orientation of the portable terminal during shooting with the shooting unit. The decision unit decides a maintenance order of a plurality of the image processing apparatuses according to the respective states of the plurality of image processing apparatuses shot with the shooting unit that are specified from a position and an orientation of the portable terminal during shooting and positions of the image processing apparatuses.

According to yet another aspect of the present invention, a display method is performed in a portable terminal in an image processing system including the portable terminal having a shooting unit, a plurality of image processing apparatuses, and a server. Each of the plurality of image processing apparatuses includes a sensor for detecting a state of the image processing apparatus. The display method includes the steps of: acquiring each detected value in the sensor as a state of each of the image processing apparatuses; deciding a maintenance order of the plurality of image processing apparatuses according to the state of each image processing apparatus; and combining a shot image of the image processing apparatus obtained by shooting with the shooting unit with an image representing the decided maintenance order, and displaying the combined image on the portable terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing a specific example of an MFP list stored in the MFP.

FIG. 10 is a diagram showing a specific example of priority setting information as terminal information stored in the MFP.

FIG. 14 is a diagram showing a specific example of priority setting information as terminal information stored in the server of the image processing system according to the second embodiment.

DESCRIPTION OF THE PREFERRED EMBODIMENTS

Figure 1:
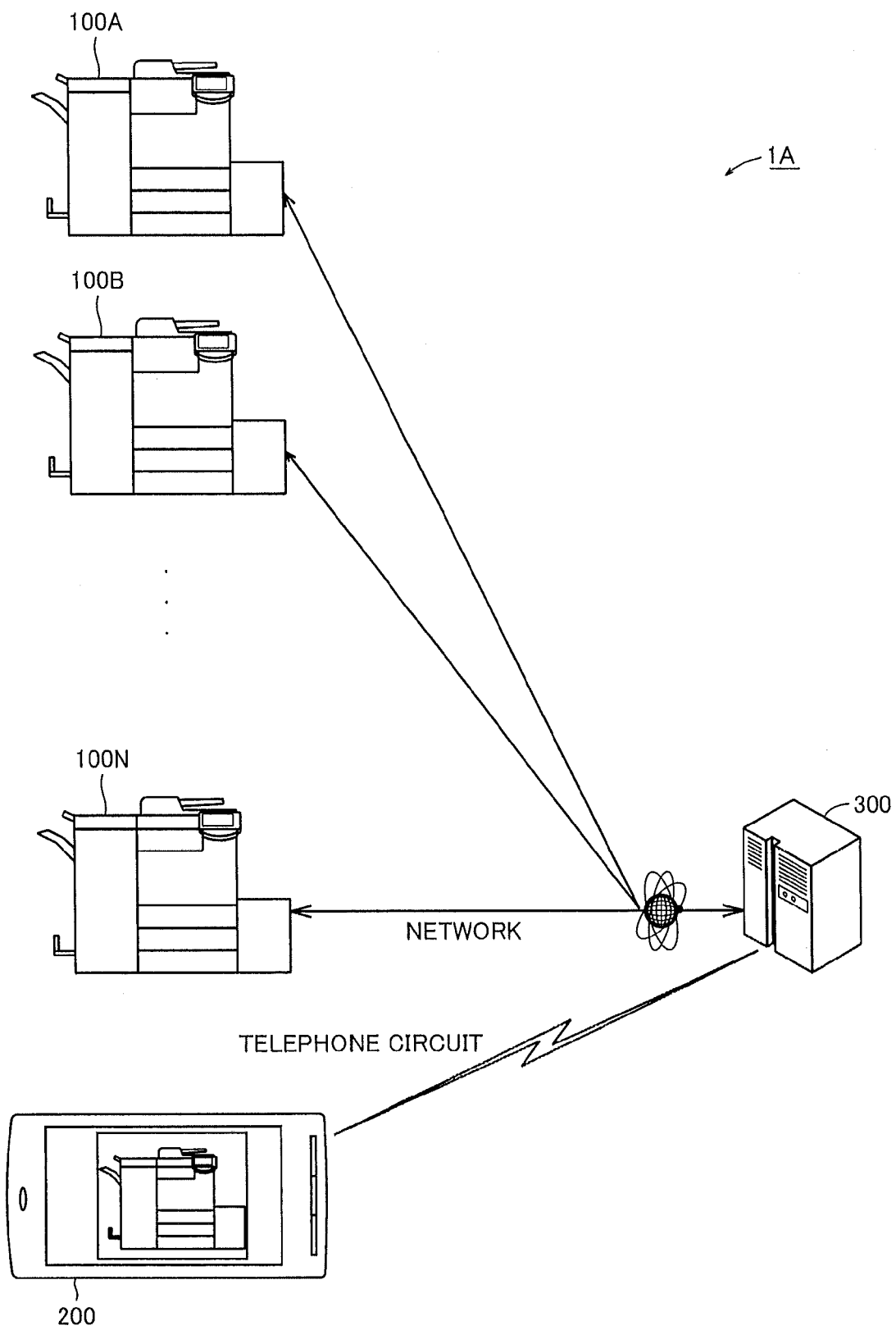
FIG. 1 is a diagram showing a specific example of a configuration of an image processing system according to a first embodiment.

In the following, embodiments of the present invention will be described with reference to the figures. In the following description, the same parts and components are denoted with the same reference numerals. Their names and functions are also the same.

First Embodiment

System Configuration

FIG. 1 is a diagram showing a specific example of a configuration of an image processing system 1A according to a first embodiment.

Referring to FIG. 1, image processing system 1A according to the first embodiment includes MFPs (Multi-Functional Peripherals) 100A, 100B, . . . , 100N serving as a plurality of image processing apparatuses, a portable terminal 200, and a server 300. MFPs 100A, 100B, . . . , 100N are collectively referred to as MFP 100.

The image processing apparatus is not limited to an MFP and may be a printer, a facsimile machine, a copier, or any other similar device having at least one or more image processing functions. MFP 100 is an image processing apparatus that combines these functions.

Portable terminal 200 is, for example, a mobile phone or any other device at least having a camera function, an instruction input function, and a communication function.

The server is a general personal computer or any other similar device.

MFP 100 and potable terminal 200 can communicate with each other and exchange information with each other. Any communication system may be employed in the communication between MFP 100 and portable terminal 200 as long as it is wireless communication. In the example below, wireless communication using Bluetooth® is employed. However, any other communication such as infrared communication or short-distance wireless communication may be employed.

MFP 100 and server 300 can also communicate with each other and exchange information with each other. The communication between MFP 100 and server 300 is either wired or wireless, and any communication system may be employed. Since it is assumed that the image processing system according to the present embodiment is used in an office environment, MFP 100 and server 300 are connected to a wired or wireless LAN (Local Area Network) and exchange information through the network, by way of example.

Portable terminal 200 and server 300 can also communicate with each other and exchange information with each other. Any communication system may be employed in the communication between portable terminal 200 and server 300 as long as it is wireless communication. In the example below, wireless communication using a telephone network is employed. However, infrared communication or short-distance wireless communication such as Bluetooth® may be employed. In the case where portable terminal 200 and server 300 are connected to a wireless LAN, information may be exchanged over the network.

MFP 100 may be able to communicate with portable terminal 200. Examples of the communication include wireless communication using Bluetooth®, infrared communication, and short-distance wireless communication.

In the following description, different communication systems are employed, specifically, communication via a LAN between MFP 100 and server 300, and wireless communication using a telephone network between portable terminal 200 and server 300. However, the same communication system such as communication via a LAN may be employed in each communication.

<Configuration of MFP>

Figure 2:
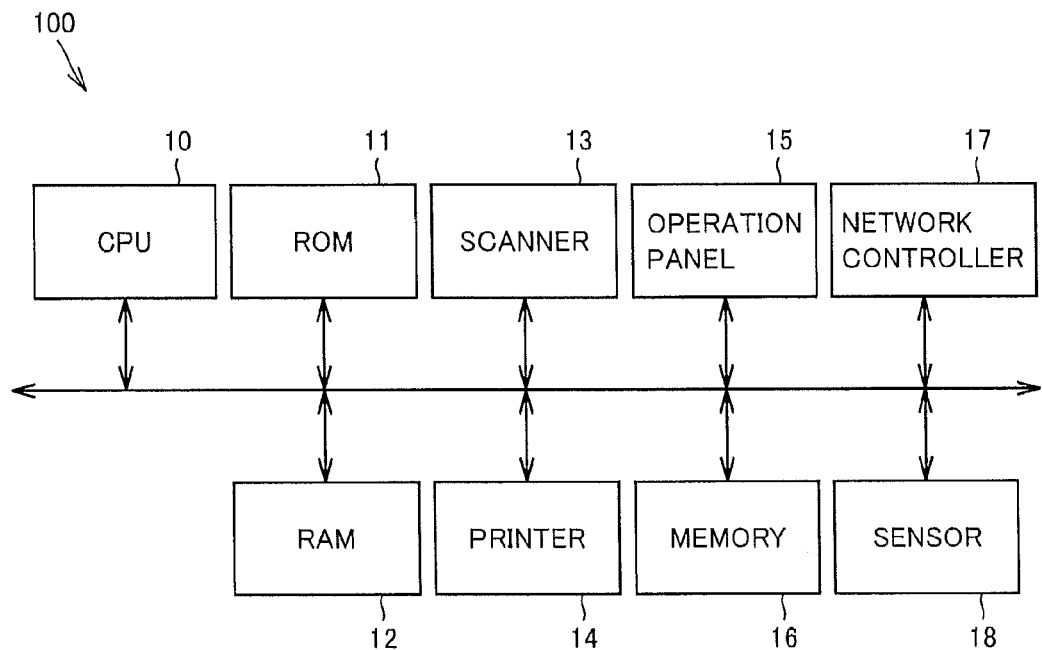
FIG. 2 is a diagram showing a specific example of a hardware configuration of an MFP (Multi-Functional Peripheral) included in the image processing system.

FIG. 2 shows a specific example of a hardware configuration of MFP 100.

Referring to FIG. 2, MFP 100 includes a CPU (Central Processing Unit) 10 as an arithmetic unit for controlling MFP 100 as a whole, a ROM (Read Only Memory) 11 for storing a program executed in CPU 10, a RAM (Random Access Memory) 12 functioning as a work area for executing a program in CPU 10, a scanner 13 for optically scanning a document placed on a not-shown platen to obtain image data, a printer 14 for fixing image data on print paper, an operation panel 15 including a touch panel for displaying information and accepting an operation input to MFP 100, a memory 16 for storing image data, a communication controller 17 for controlling communication via a LAN, and a sensor 18 for detecting a status of MFP 100.

Operation panel 15 includes a touch panel and operation keys (not shown). The touch panel, configured to include a display such as a liquid crystal display and a position designating device such as an optical touch panel or a capacitive touch panel, displays an operation screen and specifies a designated position on the operation screen. CPU 10 allows the touch panel to display an operation screen, based on data for allowing image display that is stored beforehand.

Sensor 18 includes, for example, a sensor for detecting the remaining amount of toner, a sensor for detecting a jam (paper jam), an abnormal temperature, and an operation error in each unit, and the like. Sensor 18 may include a counter for counting the amounts of copy, scan, and print.

<Configuration of Portable Terminal>

Figure 3:
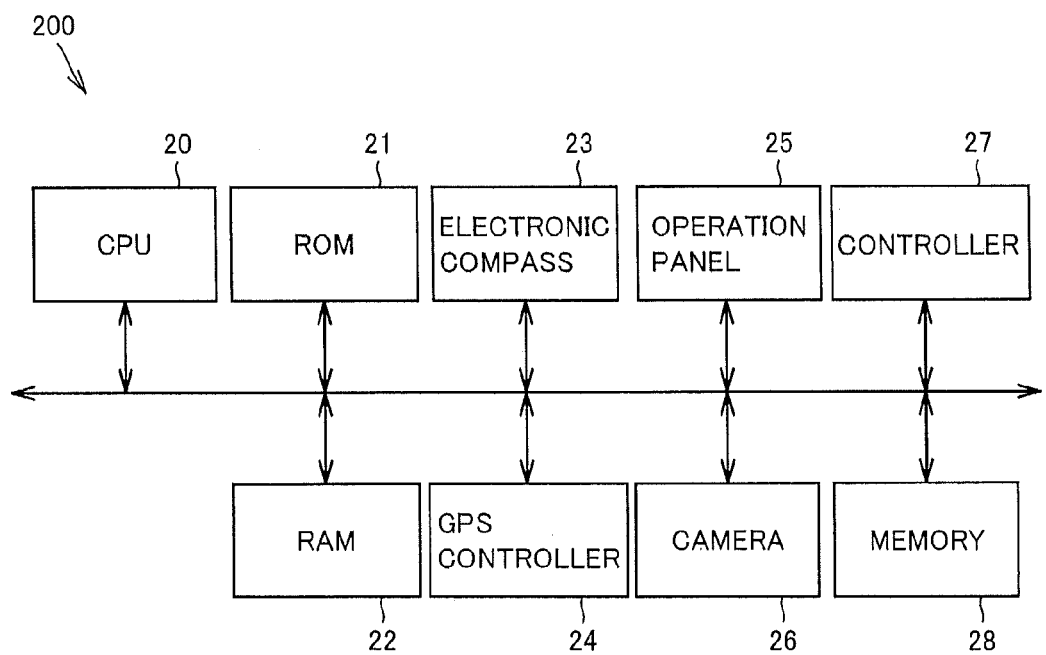
FIG. 3 is a diagram showing a specific example of a hardware configuration of a portable terminal included in the image processing system.

FIG. 3 is a diagram showing a specific example of a hardware configuration of portable terminal 200.

Referring to FIG. 3, portable terminal 200 includes a CPU 20 as an arithmetic unit for controlling portable terminal 200 as a whole, a ROM 21 for storing a program executed in CPU 20, a RAM 22 functioning as a work area for executing a program in CPU 20, an electronic compass 23 including a magnetic sensor for detecting an orientation of potable terminal 200, a GPS (Global Positioning System) controller 24 receiving a GPS signal or a positional signal from a base station for obtaining positional information of portable terminal 200, an operation panel 25 including a touch panel for displaying information and accepting an operation input to portable terminal 200, a camera 26, a controller 27 for controlling communication via a telephone network through communication with a not-shown base station, and a memory 28 for storing telephone book data and the like.

Operation panel 25 may be configured similar to operation panel 15 of MFP 100. More specifically, it includes, for example, a touch panel formed of a display such as a liquid crystal display and a position designating device such as an optical touch panel or a capacitive touch panel, and operation keys.

CPU 20 allows the touch panel to display an operation screen based on data for allowing screen display that is stored beforehand. A designated position on the operation screen is specified on the touch panel, and an operation signal indicating the designated position is input to CPU 20. An operation signal indicating the pressed key is also input to CPU 20. CPU 20 specifies an operation content based on the pressed key, or the displayed operation screen and the designated position, and executes a process based on the operation content.

Electronic compass 23 and GPS controller 24 output a signal to CPU 20 to indicate the obtained orientation or positional information of potable terminal 200.

<Configuration of Server>

Figure 4:
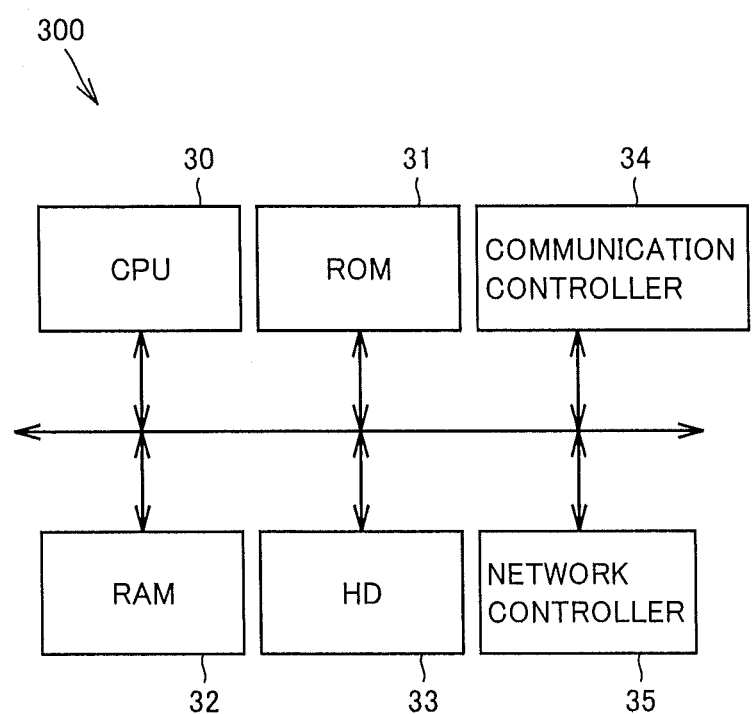
FIG. 4 is a diagram showing a specific example of a hardware configuration of a server included in the image processing system.

FIG. 4 is a diagram showing a specific example of a hardware configuration of server 300.

Referring to FIG. 4, server 300 is formed, for example, of a general computer as described above. By way of example, server 300 includes a CPU 30 as an arithmetic unit for controlling server 300 as a whole, a ROM 31 for storing a program executed in CPU 30, a RAM 32 functioning as a work area for executing a program in CPU 30, an HD (Hard Disk) 33 for storing MFP information described later and the like, a communication controller 34 for controlling communication via a telephone network, and a network controller 35 for controlling communication via a LAN.

<Operation Overview>

Image processing system 1A according to the first embodiment is used in such a manner that a serviceman carries portable terminal 200 for maintenance of a plurality of MFPs 100A, 100B, . . . , 100N installed in a customer environment.

Information for each MFP 100 is registered in advance as "MFP information" in server 300. The "MFP information" refers to information about an MFP 100 included in image processing system 1A that is registered in server 300, and includes positional information for specifying a location of the MFP 100 and status information representing a status of the MFP 100. Counter information representing the utilization of the MFP 100 may be additionally included. A specific example thereof will be described later. A plurality of MFP information stored in server 300 is also called an "MFP list" in the following description.

The MFP information is registered at a predetermined timing, for example, at a timing when MFP 100 is powered on, at a timing when MFP 100 is connected to image processing system 1A, at predetermined time intervals, or at a timing when the state is changed. The positional information may be input by a predetermined user such as an administrator, or may be input by accepting a signal from MFP 100, if MFP 100 includes a not-shown position obtaining mechanism.

The status information is information representing a state of MFP 100 and refers to information indicating whether an error occurs or not and the content of the error for each of predetermined items. Examples of the status information include JAM information that is information about a paper jam, trouble information that is information representing the location and the content of an error, and the counter information described above.

The status information may be input by accepting a detection result in sensor 18 from MFP 100, may be input by a predetermined user such as an administrator, or may be input by accepting it from portable terminal 200.

Information for each portable terminal 200 is registered in advance as "terminal information" in server 300. The "terminal information" refers to information about portable terminal 200 included in image processing system 1A that is registered in server 300, and at least includes priority setting information that is information to be used to determine the priority of maintenance.

The priority setting information is information representing what factor, such as troubles or conditions, is used to determine the order in which maintenance is started. The factors used to determine the order in which maintenance is started include, for example, the distance from portable terminal 200 (the serviceman who carries it), the content and the state of the trouble in MFP 100, the frequency of use of MFP 100, the frequency of maintenance of MFP 100, whether a particular operation mode is set, whether part replacement is required, and whether cleaning is required. The priority setting information is information in which of a plurality of factors is to be used, or an order in which the factors are used, is set to determine the maintenance order.

The priority setting information is registered when the serviceman who is the user of portable terminal 200 performs a setting operation using portable terminal 200 and transmits the information from portable terminal 200 to server 300.

In the following description, the "terminal information" including the priority setting information is associated with portable terminal 200 and registered in server 300. However, the priority setting information may be registered as "user information" that is associated with a serviceman. In this case, a serviceman performs a login operation when using portable terminal 200, and the priority setting information registered as the user information of the authenticated serviceman is used to determine the priority of maintenance as described later.

Figure 5:
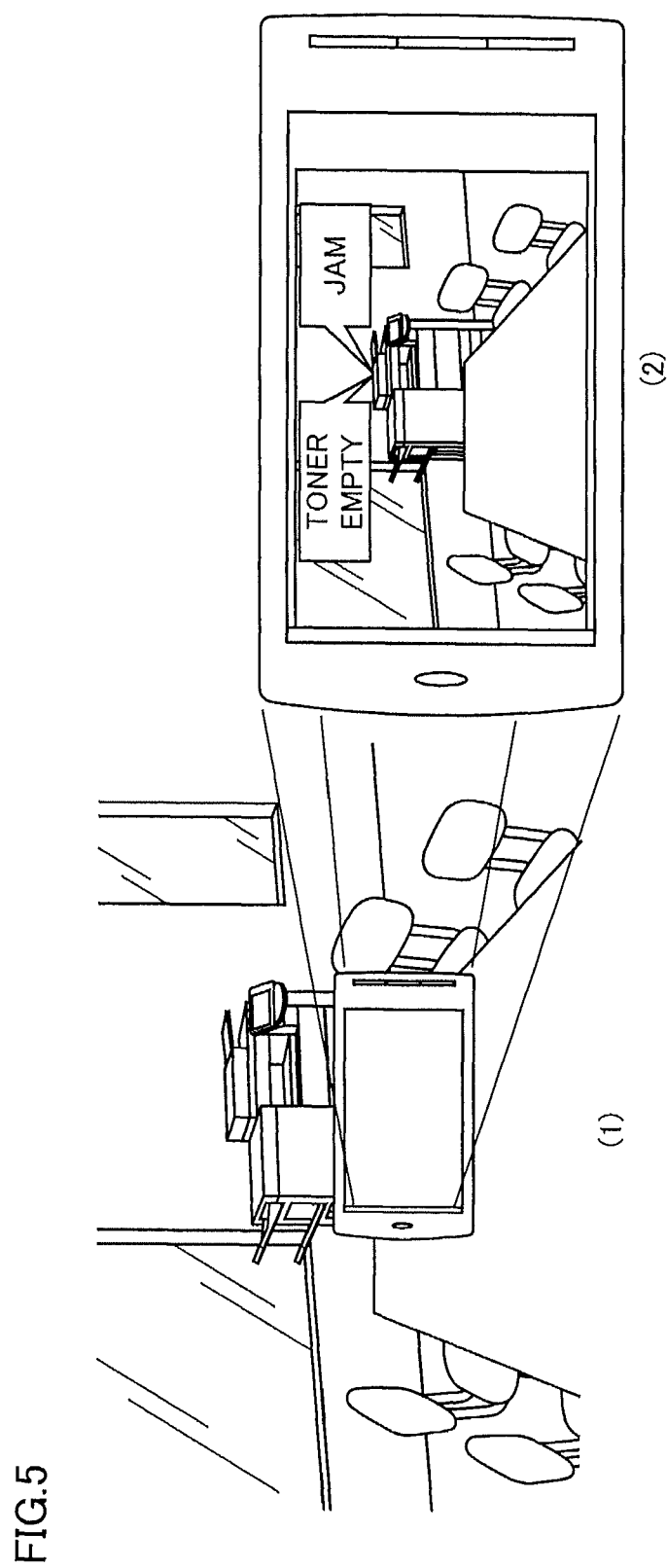
FIG. 5 and FIG. 6 are diagrams for explaining an operation overview in the image processing system according to the first embodiment.
Figure 6:
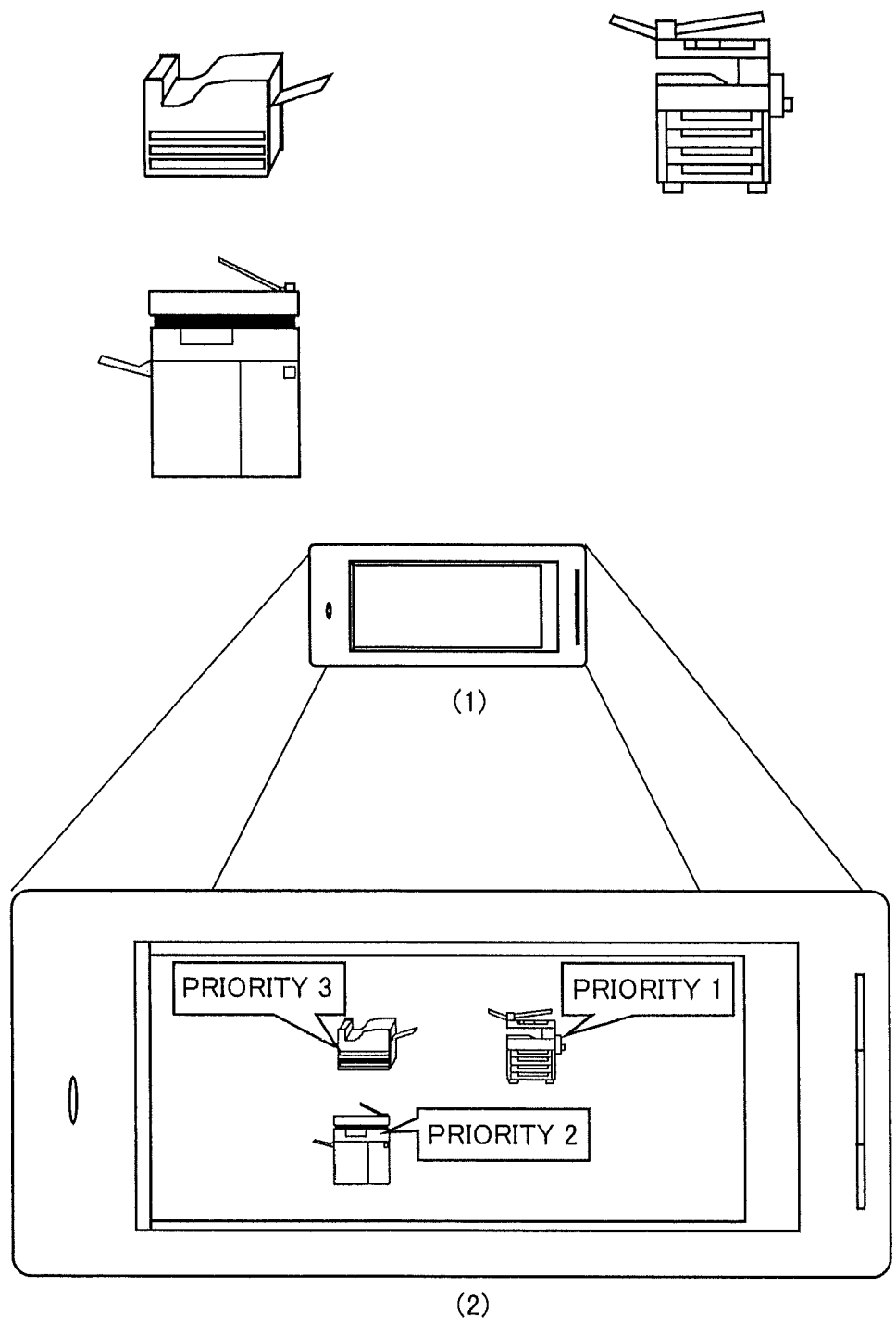

FIG. 5 and FIG. 6 are diagrams for explaining an operation overview in image processing system 1A according to the first embodiment.

For maintenance of MFP 100, the serviceman points portable terminal 200 at a target MFP 100 and takes a picture ((1) in FIG. 5). Then, a shot image of MFP 100 appears on the display screen of portable terminal 200. The state of MFP 100 is displayed with a tag superimposed on the shot image ((2) in FIG. 5).

The "tag" refers to information displayed in association with a displayed object. In the case of this shooting, information representing an error content (trouble) of the target MFP 100 is displayed, as illustrated in (2) in FIG. 5. In the example of (2) in FIG. 5, toner shortage (toner empty) and paper jam (jam) in MFP 100 as a maintenance target are shown with tags.

In image processing system 1A according to the first embodiment, the serviceman further points portable terminal 200 at a plurality of MFPs 100 as maintenance targets and takes a picture ((1) in FIG. 6). Then, a shot image including a plurality of MFPs 100 appears on the display screen of portable terminal 200. Then, the priorities of maintenance of MFPs 100 are displayed with tags superimposed on the shot image ((2) in FIG. 6).

In the case of this shooting, information representing the respective priorities of maintenance of a plurality of MFPs 100 (the order of priority), that is, the maintenance order, is displayed as tags as illustrated in (2) in FIG. 6. In the example of (2) in FIG. 6, three MFPs are displayed on the display screen of portable terminal 200, and the respective priorities, Priority 1 to Priority 3, are represented with tags. In other words, the maintenance order of these three MFPs is represented with tags.

<Functional Configuration>

MFP 100 at least includes, as a functional configuration of MFP 100 for implementing the operation described above, a function for detecting a state of each unit using sensor 18 and a function for transmitting the detection result to server 300. These functions are mainly formed in CPU 10 when CPU 10 reads out a program stored in ROM 11 and executes the program on RAM 12. However, at least part of the functions may be formed by the hardware configuration shown in FIG. 2.

Figure 7:
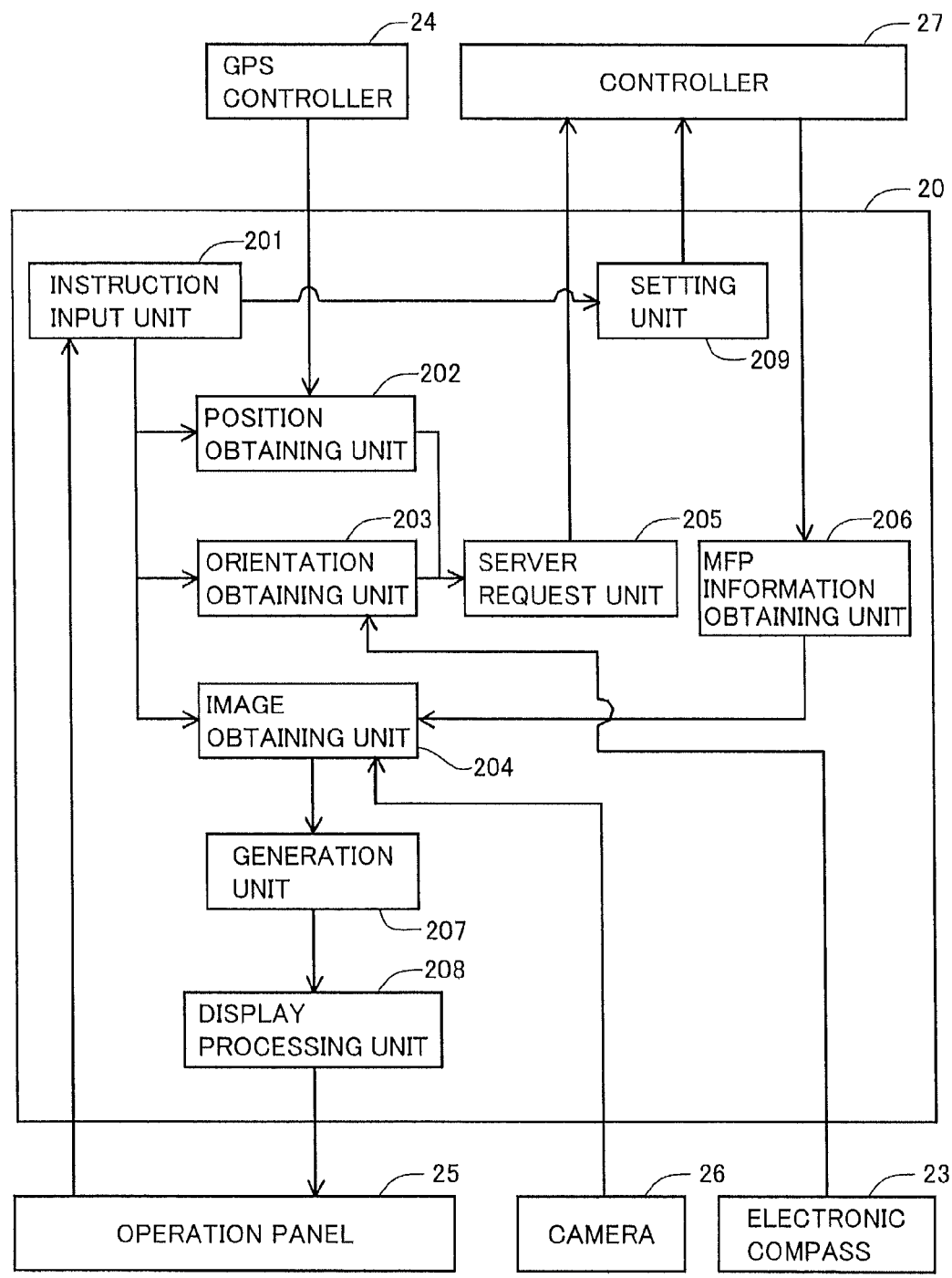
FIG. 7 is a block diagram showing a specific example of a functional configuration of the portable terminal.

FIG. 7 is a block diagram showing a specific example of a functional configuration of portable terminal 200 for implementing the operation above. Each function shown in FIG. 7 is a function mainly formed in CPU 20 when CPU 20 reads out a program stored in ROM 21 and executes the program on RAM 22. However, at least part of the functions may be formed by the hardware configuration shown in FIG. 3.

Referring to FIG. 7, as functions for implementing the operations as described above, portable terminal 200 includes an instruction input unit 201 for accepting an instruction input from operation panel 25, a position obtaining unit 202 for obtaining positional information of portable terminal 200 from GPS controller 24 in response to a shooting instruction from operation panel 25, an orientation obtaining unit 203 for obtaining an orientation of portable terminal 200 from electronic compass 23 in response to a shooting instruction from operation panel 25, an image obtaining unit 204 for obtaining image data captured by shooting by camera 26 in response to a shooting instruction from operation panel 25, a server request unit 205 for transmitting the positional information and orientation information obtained in response to a shooting instruction from operation panel 25, through controller 27 to server 300 for requesting the MFP information from server 300, an MFP information obtaining unit 206 for obtaining the MFP information of MFP 100 serving as an operation target from server 300 through controller 27 in response to the request, a generation unit 207 for generating screen data by combining a tag with image data based on the image data obtained by shooting and the MFP information, a display processing unit 208 for executing a process of displaying screen data on operation panel 25, and a setting unit 209 for making settings for deciding the priority in portable terminal 200 in accordance with an instruction input from operation panel 25.

Since positional obtaining unit 202 and orientation obtaining unit 203 obtain positional information and orientation information, respectively, in response to a shooting instruction from operation panel 25, the information thereof can serve as information of a shooting position and information of a shooting direction, respectively. Then, in the description below, the positional information and the orientation information transmitted from portable terminal 200 to server 300 in accordance with the program are also referred to as shooting position information and shooting direction information, respectively.

Server request unit 205 requests the MFP information and the like from server 300 by transmitting at least the shooting position information and the shooting direction information to server 300. This request may include, as additional information, for example, information specifying portable terminal 200 or may include login information of the user (serviceman) who logs into portable terminal 200.

Setting unit 209 accepts a selection operation (touch on operation panel 25) on a setting screen that presents a plurality of factors described above in a selectable manner for deciding the maintenance order, then sets the selected factor or the factors in the selected order as the priority setting information, and transmits the priority setting information to server 300 through controller 27.

Figure 8:
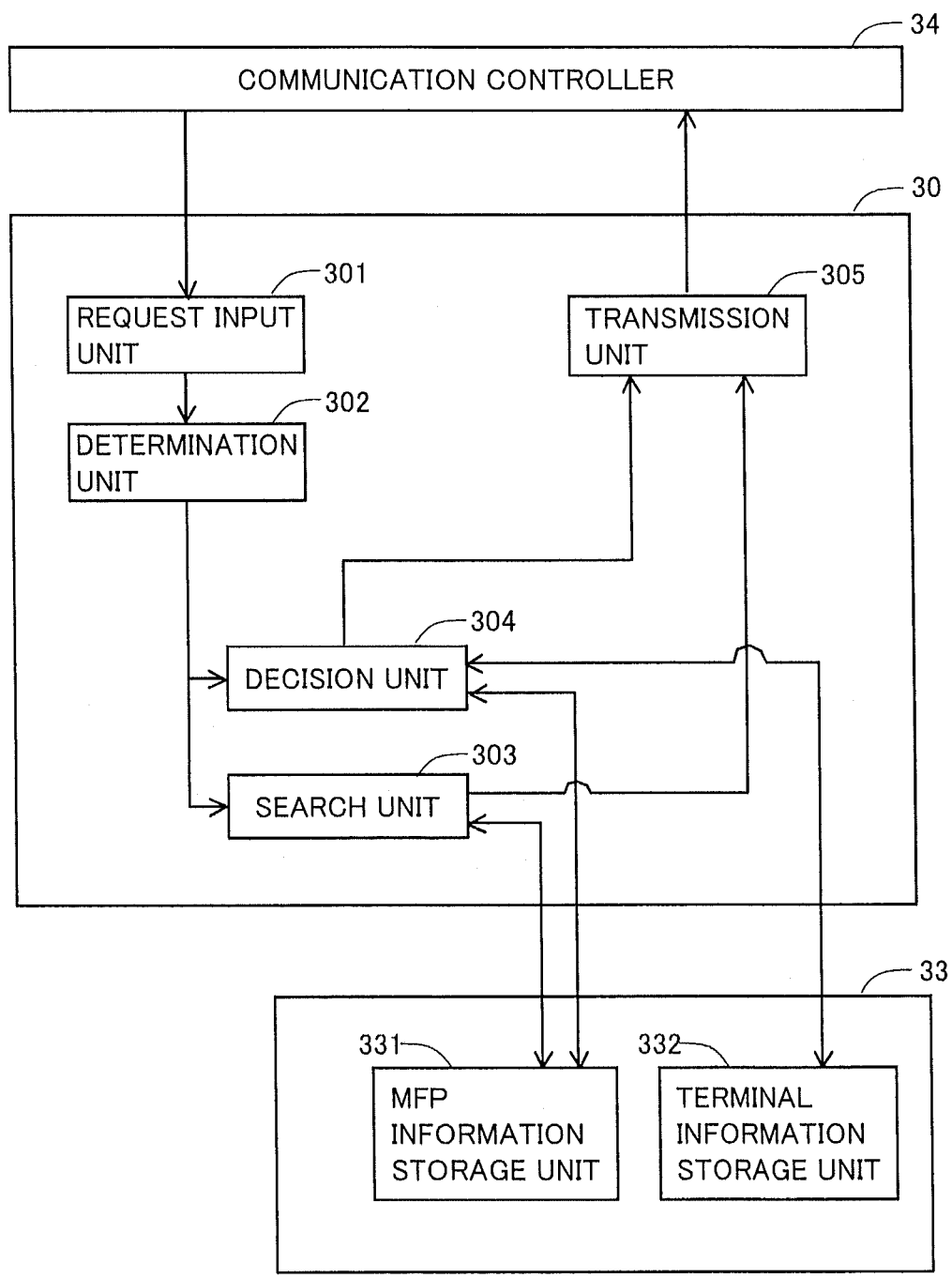
FIG. 8 is a block diagram showing a specific example of a functional configuration of the server.

FIG. 8 is a block diagram showing a specific example of a functional configuration of server 300. Each function shown in FIG. 8 is a function mainly formed in CPU 30 when CPU 30 reads out a program stored in ROM 31 and executes the program on RAM 32. However, at least part of the functions may be formed by the hardware configuration shown in FIG. 4.

Referring to FIG. 8, HD 33 includes an MFP information storage unit 331 that is a storage area for storing the MFP information as an MFP list and a terminal information storage unit 332 that is a storage area for storing the terminal information including the priority setting information transmitted from portable terminal 200 as described above in association with the portable terminal 200.

Further referring to FIG. 8, as functions for implementing the operation described above, server 300 includes a request input unit 301 for accepting input of the request above from portable terminal 200 through communication controller 34, a determination unit 302 for determining whether the request is to request a state of MFP 100 as a maintenance target or to request the maintenance order of a plurality of MFPs 100 as maintenance targets, a search unit 303 for searching for an MFP present in a shooting range of portable terminal 200 based on the shooting position and the shooting direction of portable terminal 200 by referring to each positional information in the MFP list, and for reading the MFP information of the found MFP from MFP information storage unit 331, a decision unit 304 for searching for a plurality of MFPs present in the shooting range of portable terminal 200 based on the shooting position and the shooting direction of portable terminal 200 by referring to each positional information in the MFP list, and for deciding the maintenance order of those plurality of MFPs by referring to each status information in the MFP list and the priority setting information included in the terminal information, and a transmission unit 305 for transmitting the read MFP information or the decided maintenance order to portable terminal 200 through communication controller 34.

FIG. 9 shows a specific example of the MFP list stored in MFP information storage unit 331. Each MFP stores the positional information and the status information as information necessary for maintenance in a prescribed area of memory 16 and transmits the information to server 300 at a predetermined timing such as a timing when a status change occurs or a timing when a request is made from server 300. The MFP information transmitted from each MFP is stored in MFP information storage unit 331 in the form of a list depicted in FIG. 9, by way of example.

Each MFP may transmit a value detected by sensor 18, and in addition, CPU 10 may store in advance a threshold value for determining whether an error occurs, so that each MFP can determine whether an error occurs, and transmit the determination result together with the detection result. In the example in FIG. 9, the detected value for each item as well as the determination result as to whether the detected value is normal or not is stored as the MFP list. In FIG. 9, the field indicating an abnormal value is represented with a double line.

FIG. 10 shows a specific example of the priority setting information as the terminal information stored in terminal information storage unit 332. Referring to FIG. 10, the priority setting information as the terminal information is associated with portable terminal 200 and specifies the factors to be used to determine the maintenance order of a plurality of MFPs in that portable terminal 200. In the example in FIG. 10, a plurality of factors are illustrated, and the order in which they are used to determine the maintenance order is set. Specifically, the maintenance order is decided by giving priority to the distance from portable terminal 200, and the maintenance order is thereafter decided using the degree of seriousness of the state in MFP 100, the frequency of use, and the frequency of maintenance, and the like, in this order, As an example of the determination in determination unit 302, when one MFP or MFPs fewer than a prescribed threshold value are included in the shooting range of portable terminal 200, based on the shooting position and the shooting direction included in a request from portable terminal 200 and the positional information included in each MFP information, it is determined that the request is to request the state of the MFP(s). On the other hand, when a plurality of MFPs or MFPs more than the threshold value are included, it is determined that the request is to request the maintenance order of these plurality of MFPs 100.

The determination in determination unit 302 is not limited to this process, and any other process may be employed, as a matter of course. As another example, for example, an operation for specifying which request is made may be performed in portable terminal 200, and the content of the request may be included in the request.

Decision unit 304 decides the maintenance order of a plurality of MFPs 100 present in the image shot by portable terminal 200, based on their MFP information and the priority setting information for that portable terminal 200. For example, in a case where the priority setting information shown in FIG. 10 is registered in association with the portable terminal 200, decision unit 304 calculates each distance based on the respective positional information of a plurality of MFPs 100 present in the image shot by the portable terminal 200 and the position of the portable terminal 200, and decides the maintenance order in order of increasing distance. At that time, if there exist a plurality of MFPs 100 having the same distance, or the difference in distance among a plurality of MFPs 100 falls within a predetermined range, the maintenance order is decided in order of abnormal values or in order of increasing deviation from the normal value, by referring to the trouble information for those MFPs 100. In the following, if there exist a plurality of MFPs ranked in the same place, the maintenance order is decided using the factors in the set order.

<Operation Flow>

Figure 11:
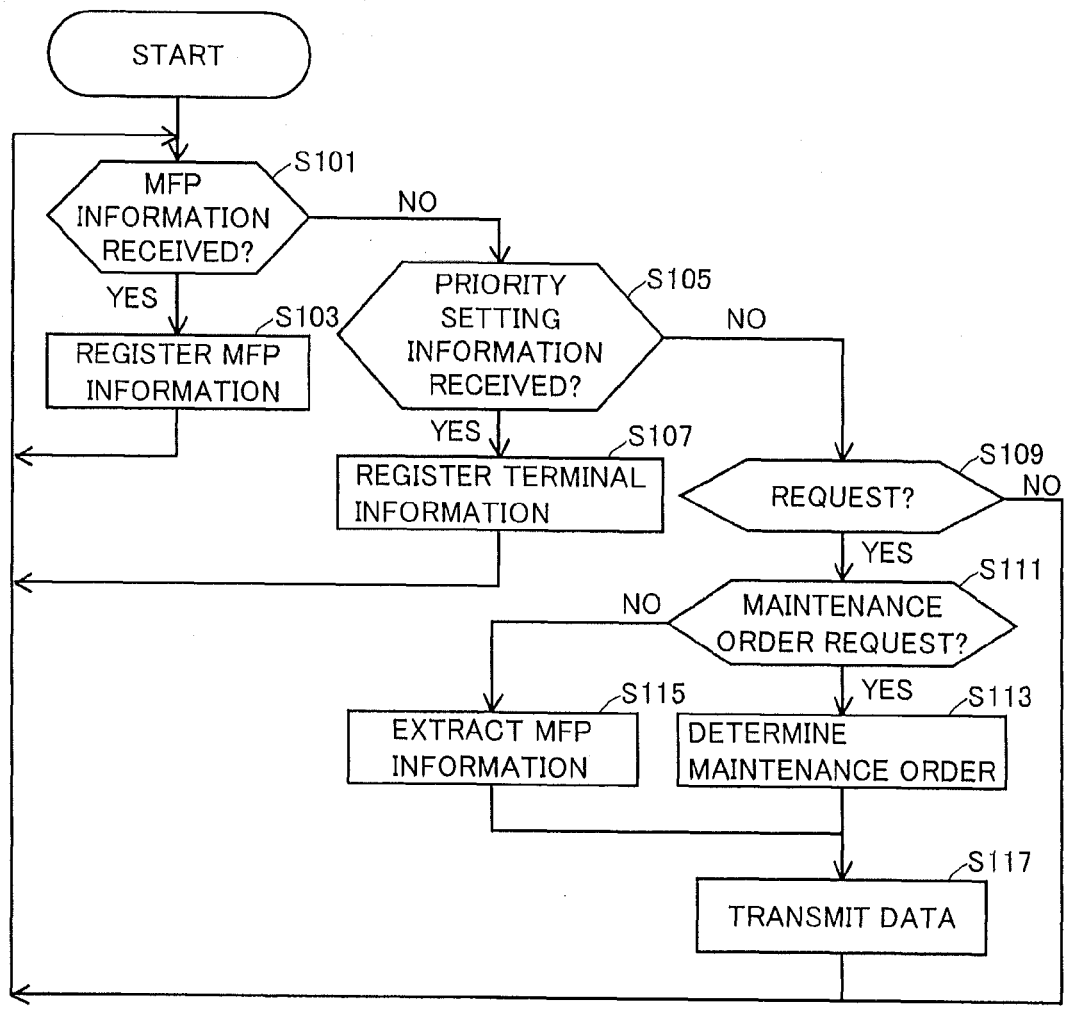
FIG. 11 is a flowchart illustrating a specific example of an operation flow in the server.

FIG. 11 is a flowchart illustrating a specific example of an operation flow in server 300. The operation shown in the flowchart in FIG. 11 is implemented by CPU 30 reading out a program stored in ROM 31 and executing the program on RAM 32 to perform the functions shown in FIG. 8.

Referring to FIG. 11, CPU 30 of server 300 receives the MFP information such as the positional information and the status information from MFP 100 (YES in step S101) and then registers the MFP information in association with MFP 100 in step S103. Here, if the MFP information associated with that MFP 100 has already been registered, the MFP information is updated with the received MFP information.

For example, when maintenance is finished by a serviceman, sensor 18 of MFP 100 detects that the target part is back to normal, and transmits that information as MFP information to server 300. Accordingly, the MFP information of that MFP 100 that is registered in server 300 is updated. In other words, the MFP information is updated in real time in response to maintenance.

When the priority setting information is received from portable terminal 200 (NO in step S101, YES in step S105), in step S107, CPU 30 registers the priority setting information in association with portable terminal 200. Here, if the priority setting information associated with that portable terminal 200 has already been registered, the priority setting information is updated with the received priority setting information.

When a request including the shooting position and the shooting direction is received from portable terminal 200 (NO in steps S101, S105, YES in step S109), CPU 30 determines whether the request is to request the state of MFP 100 as a maintenance target or to request the maintenance order of a plurality of MFPs 100 as maintenance targets. Then, if it is determined that the request is to request the maintenance order (YES in step S111), in step S113, CPU 30 specifies MFPs in the shooting range of portable terminal 200 that has made the request, and refers to their MFP information to specify the maintenance order of these MFPs using the factors according to the priority defined in the priority setting information associated with the portable terminal 200.

On the other hand, if it is determined that the request is to request the state of MFP 100 as a maintenance target (NO in step S111), in step S115, CPU 30 specifies the MFP in the shooting range of portable terminal 200 that has made the request, and extracts the MFP information of the specified MFP. Here, the information representing the state of the MFP to be displayed with a tag on portable terminal 200 may be further extracted from the MFP information.

In step S117, CPU 30 transmits the information indicating the maintenance order decided in step S113 above or the MFP information of the maintenance target MFP extracted in step S115, to the portable terminal 200 that has made the request.

Server 300 repeatedly performs the process above to perform an operation in accordance with the MFP information from MFP 100 and the priority setting information or the request from portable terminal 200.

Figure 12:
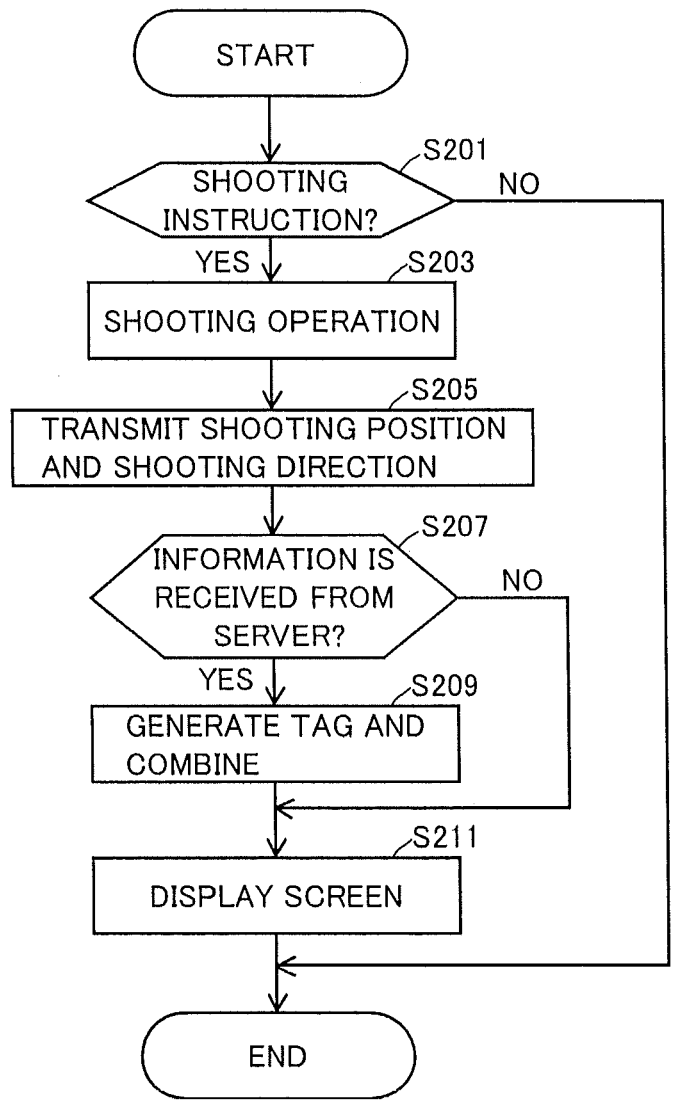
FIG. 12 is a flowchart illustrating a specific example of an operation flow in the portable terminal.

FIG. 12 is a flowchart illustrating a specific example of an operation flow in portable terminal 200. The operation shown in the flowchart in FIG. 12 is implemented by CPU 20 reading out a program stored in ROM 21 and executing the program on RAM 22 to perform the functions shown in FIG. 7.

Referring to FIG. 12, CPU 20 of portable terminal 200 receives a shooting instruction from operation panel 25 (YES in step S201), executes a shooting operation in step S203, and transmits a request including the positional information and the orientation information at that time, as the shooting position and the shooting direction, to server 300 in step S205.

When information is received from server 300 in response to the request (YES in step S207), in step S209, CPU 20 generates a tag image based on the received information and combines the tag image with the shot image obtained through shooting in step S203 above. Then, in step S211, the resultant image is displayed on operation panel 25.

In a case where camera 26 of portable terminal 200 is pointed at a plurality of MFPs and shoots a photo, by way of example, the information specifying the maintenance order of these plurality of MFPs is transmitted from server 300, and in step S211 above, a screen that presents the maintenance order of these plurality of MFPs as tags appears on operation panel 25, as shown in FIG. 6.

In a case where camera 26 of portable terminal 200 is pointed at an MFP as a maintenance target and shoots a photo, information indicating the state of that MFP is transmitted from server 300, and in step S211 above, a screen that presents the state of that MFP as a tag appears on operation panel 25, as shown in FIG. 5.

Effects of First Embodiment

Through the operation as described above in image processing system 1A according to the first embodiment, when a shot of the maintenance target MFP is taken with camera 26 of portable terminal 200, information indicating the state of that MFP is transmitted from server 300, and in step S211 above, a screen that presents the state of the MFP as a tag appears on operation panel 25 as shown in FIG. 5.

Accordingly, the serviceman can know the state of the maintenance target MFP accurately by looking at the screen of portable terminal 200, and can perform maintenance efficiently.

In conjunction with the maintenance, the MFP information of MFP 100 is updated in server 300 receiving the detection information from that MFP 100, so that the content of the tag displayed on portable terminal 200 changes in real time based on the updated information. Therefore, in a case where a plurality of servicemen do maintenance separately as described later, the maintenance situation of other servicemen is reflected on the tag, making the maintenance efficient.

When a shot of a plurality of MFPs is taken with camera 26 of portable terminal 200, for example, information specifying the maintenance order of these plurality of MFPs is transmitted from server 300, and in step S211 above, a screen that presents the maintenance order of these plurality of MFPs as tags appears on operation panel 25 as shown in FIG. 6.

Therefore, when performing maintenance of a plurality of MFPs, the serviceman can know the maintenance order of these plurality of MFPs by taking a shot of these plurality of MFPs with portable terminal 200, and thus can do maintenance of a plurality of MFPs efficiently.

The maintenance order is decided using the priority set in advance, for example, by a serviceman using portable terminal 200. Therefore, the serviceman can do maintenance of these plurality of MFPs in the order suited to the situation or in the order suited to his workability.

The MFP information is updated in real time according to the maintenance situation as described above. Therefore, the maintenance order can be decided in real time depending on the maintenance situation. In particular, when a plurality of servicemen do maintenance separately as described later, the maintenance order for a serviceman can be decided in real time according to the maintenance situation of other servicemen. Therefore, maintenance of a plurality of MFPs can be done more efficiently.

Modification of First Embodiment

In the example above, the maintenance order is shown with tags presenting ordinal ranks as shown in FIG. 6, by way of example. As another example, the display mode of the tag (display manner) may be varied according to the maintenance order. The display mode may be varied, for example, by changing display colors, by changing display sizes, by changing flashing speeds, or by changing transparency.

In this case, the display mode is set in advance in portable terminal 200 in a similar way as the priority setting information and stored in portable terminal 200. Then, CPU 210 generates a tag according to the display manner when generating the tag in step S209 above and combines the generated tag with the shot image.

In this manner, the serviceman can recognize the maintenance order at a glance by looking at the display manner of the tag, and thus can do maintenance more efficiently.

Second Embodiment

In a second embodiment, a plurality of portable terminals 200A and 200B are used to do maintenance of a plurality of MFPs 100A, 100B, . . . , 100N.

<System Configuration>

Figure 13:
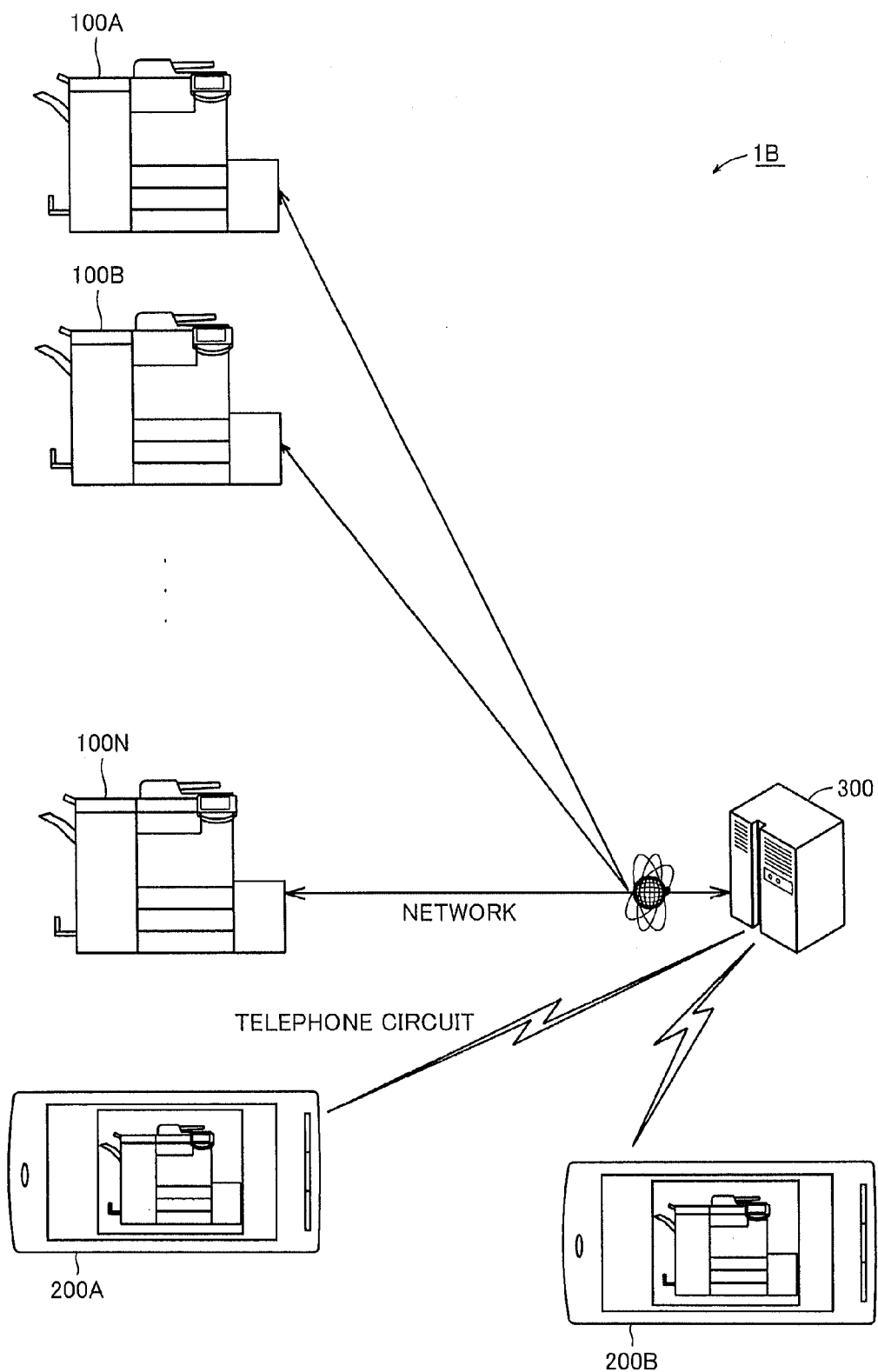
FIG. 13 is a diagram showing a specific example of a configuration of an image processing system according to a second embodiment.

FIG. 13 is a diagram showing a specific example of a configuration of an image processing system 1B according to the second embodiment.

Referring to FIG. 13, image processing system 1B according to the second embodiment includes a plurality of portable terminals 200A and 200B as portable terminal 200 in the configuration of image processing system 1A shown in FIG. 1.

<Operation Overview>

In image processing system 1B according to the second embodiment, the position of another portable terminal is considered as one factor when the maintenance order of a plurality of MFPs is decided. Whether any MFP is present in the shooting range of another portable terminal, the distance from the position of another portable terminal to each MFP, or the like is used to determine the maintenance order, by way of example.

FIG. 14 shows a specific example of the priority setting information as the terminal information stored in terminal information storage unit 332 of server 300 in image processing system 1B. In the example in FIG. 14, as one of a plurality of factors, priority is set such that an MFP not present in the shooting range of another portable terminal, that is, an MFP not captured by another portable terminal, is set higher in the maintenance order, and an MFP further from another portable terminal is set higher in the maintenance order.

CPU 30 of server 300 receives the shooting position and the shooting direction from each of portable terminals 200A and 200B to specify each position. In addition, each positional information can be specified, for example, by requesting the positional information from each portable terminal 200A, 200B at predetermined intervals or by requesting positional information from the other portable terminal when a request for deciding the maintenance order is made from one portable terminal 200. Then, CPU 30 decides the maintenance order using the respective positions of the portable terminals if they are set to be used in the priority setting information when the maintenance order is decided.

Figure 15:
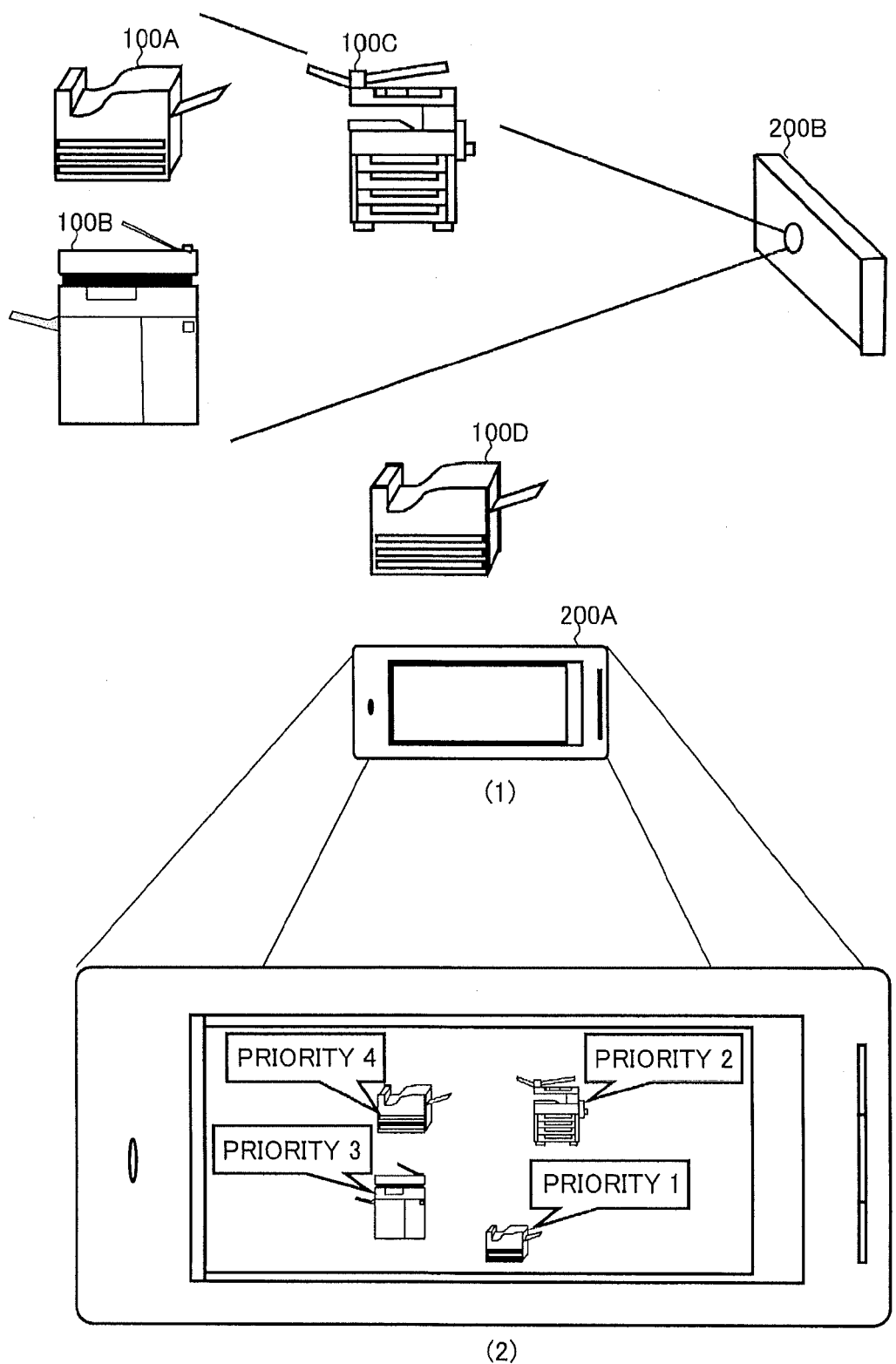
FIG. 15 is a diagram for explaining an operation overview in the image processing system according to the second embodiment.

FIG. 15 is a diagram for explaining an operation overview in image processing system 1B according to the second embodiment.

In image processing system 1B according to the second embodiment, a serviceman points portable terminal 200 at a plurality of MFPs 100 as maintenance targets and takes a picture ((1) in FIG. 15). In the case of the example (1) in FIG. 15, the image shot by portable terminal 200A includes MFPs 100A to 100D, whereas the image shot by potable terminal 200B does not include MFP 100D.

In the case where an MFP not present in the shooting range of another portable terminal is set high in the maintenance order in the priority setting information of portable terminal 200A, CPU 30 of server 300 decides that MFP 100D is set higher in the maintenance order than other MFPs, when the maintenance order of MFPs 100A to 100D is decided in response to a request for the maintenance order from portable terminal 200A. Accordingly, MFP 100D is indicated as the first place in the maintenance order with a tag on the display screen of portable terminal 200A ((2) in FIG. 15).

Effects of Second Embodiment

Through such an operation in image processing system 1B according to the second embodiment, when a plurality of servicemen carry their respective portable terminals to do maintenance of a plurality of MFPs, the maintenance order of each serviceman is decided according to the location of another serviceman.

MFPs whose maintenance order is decided are MFPs present in the shooting range, as described above. Therefore, an MFP not present in the shooting range of another portable terminal may not be a maintenance target of the serviceman who carries another portable terminal. The distance from a portable terminal is also a factor for deciding the maintenance order, as described above. Therefore, an MFP distant from another portable terminal may be late in the maintenance order.

In image processing system 1B according to the second embodiment, the maintenance order is decided as described above in server 300, so that such an MFP as described above is decided to be high in the maintenance order in the portable terminal. Thus, maintenance of a plurality of MFPs can be done efficiently as a whole.

Modification of Second Embodiment

In image processing system 1B according to the second embodiment, the maintenance order corresponding to the portable terminal concerned is decided in consideration of the location of another portable terminal. However, not only the location of another portable terminal but also any other information may be taken into consideration. For example, the maintenance order corresponding to the portable terminal concerned may be decided in consideration of the maintenance order decided corresponding to another portable terminal.

In this case, when a plurality of MFPs are ranked in the same place in the maintenance order, based on the priority setting information of the portable terminal concerned, CPU 30 of server 300 may set an MFP lower in the maintenance order in another portable terminal to be higher in the maintenance order in the portable terminal concerned, by referring to the maintenance order of these plurality of MFPs that is decided corresponding to another portable terminal.

In this manner, maintenance of a plurality of MFPs can be also done efficiently as a whole.

[Modification]

In the example above, the maintenance order is decided in server 300. However, the maintenance order may be decided in portable terminal 200. In this case, the terminal information is stored in portable terminal 200, and the respective MFP information of a plurality of MFPs is received from server 300, so that the maintenance order can be decided in a similar manner as above based on the priority setting information included in the terminal information with reference to the MFP information. In other words, decision unit 304 shown in FIG. 8 may be a function formed in CPU 20 of portable terminal 200.

In the example above, image processing system 1A, 1B includes server 300, apart from portable terminal 200. However, server 300 may be included in portable terminal 200. In other words, the functions shown in FIG. 8 may be formed in CPU 20 of portable terminal 200.

In this case, in the case where a plurality of portable terminals 200 are included in the system as in image processing system 1B according to the second embodiment, one of the portable terminals may function as server 300.

A program for allowing server 300 or portable terminal 200 to execute the operation above may be provided. Such a program may be stored in a computer-readable recording medium accompanying a computer, such as a flexible disk, a CD-ROM (Compact Disk-Read Only Memory), a ROM, a RAM, and a memory card, and be provided as a program product. Alternatively, the program may be stored in a recording medium such as a hard disk contained in a computer. The program may be downloaded via a network.

The program in accordance with the present invention may allow the process to be executed by invoking necessary modules, among program modules provided as a part of Operating System (OS) of a computer, in a prescribed sequence at a prescribed timing. In this case, the modules are not included in the program itself and the process is executed in cooperation with the OS. The program that does not include such modules may also be included in the program in accordance with the present invention.

Furthermore, the program in accordance with the present invention may be embedded in a part of another program. In this case, the modules included in another program are not included in the program itself, and the process is executed in cooperation with another program. Such a program embedded in another program may also be included in the program in accordance with the present invention.

The provided program product is installed in a program storage unit such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
a portable terminal including a shooting unit and a display unit;
a plurality of image processing apparatuses each including
a sensor for detecting a state of the image processing apparatus; and
a server capable of mutually communicating with said portable terminal, wherein
said server (i) includes a first acquisition unit for acquiring a detected value in said sensor as information of each of said plurality of image processing apparatuses, (ii) includes a second acquisition unit for acquiring a position and an orientation of said portable terminal during shooting with said shooting unit, and (iii) acquires positional information of the image processing apparatus as said information of each image processing apparatus using said first acquisition unit,
said server or said portable terminal includes a first processing unit for executing a process of deciding a priority of said plurality of image processing apparatuses by referring to said information of each image processing apparatus, wherein said first processing unit decides a priority of image processing apparatuses present in a shooting range of said portable terminal, among said plurality of image processing apparatuses, by referring to said information of each image processing apparatus, and
said portable terminal includes a second processing unit for executing a process of combining a shot image of an image processing apparatus obtained by shooting with said shooting unit, with an image representing said decided priority for that image processing apparatus, and displaying the combined image on said display unit.

2. The image processing system according to claim 1, wherein said state of the image processing apparatus is represented by at least one of: counter information representing a number of times of image processing operations; information representing whether an error occurs in each unit; information representing history of errors; information representing whether part replacement is required; information about an operation mode; information representing frequency and history of maintenance; and information representing whether cleaning or check is required.

3. The image processing system according to claim 1, wherein said portable terminal further includes a display processing unit for changing a display manner of said image representing the decided priority, according to the priority.

4. An image processing system comprising:
a portable terminal including a shooting unit and a display unit;
a plurality of image processing apparatuses each including
a sensor for detecting a state of the image processing apparatus, said state of the image processing apparatus being a state concerning a plurality of items; and
a server capable of mutually communicating with said portable terminal, wherein
said server includes a first acquisition unit for acquiring a detected value in said sensor as information of each of said plurality of image processing apparatuses,
said server or said portable terminal includes a first processing unit for executing a process of deciding a priority of said plurality of image processing apparatuses by referring to said information of each image processing apparatus, and
said portable terminal includes
(i) a second processing unit for executing a process of combining a shot image of an image processing apparatus obtained by shooting with said shooting unit, with an image representing said decided priority for that image processing apparatus, and displaying the combined image on said display unit, and
(ii) a setting unit for setting priorities of the items of said state of the image processing apparatus to be used to determine said priority of the image processing apparatus, and
said first processing unit decides a priority of said plurality of image processing apparatuses according to the respective states of said plurality of image processing apparatuses that are represented by the items in accordance with said set priorities.

5. A portable terminal:
- a shooting unit;
- a display unit;
- a display processing unit for performing a process of allowing said display unit to display a screen based on an image shot by said shooting unit, wherein said display processing unit executes a process of combining a shot image obtained by shooting a plurality of image processing apparatuses with said shooting unit, with an image representing a respective priority of said plurality of image processing apparatuses, and displaying the combined image on said display unit;
- a detection unit for detecting a position and an orientation of the portable terminal during shooting with said shooting unit;
- a first acquisition unit for acquiring a state of said image processing apparatus;
- a second acquisition unit for acquiring a position of said image processing apparatus; and
- a decision unit for deciding a priority of said plurality of image processing apparatuses, according to the state of said image processing apparatus shot by said shooting unit that is specified from a detection result in said detection unit and a position of said image processing apparatus.

6. The portable terminal according to claim 5, further comprising:
- a detection unit for detecting a position and an orientation of the portable terminal during shooting with said shooting unit; and
- a request unit for transmitting a detection result in said detection unit to another apparatus to request information representing a priority of said plurality of image processing apparatuses.

7. An information processing apparatus configured to communicate with a portable terminal including a shooting unit, said information processing apparatus comprising:
- a first acquisition unit for acquiring, as a state of an image processing apparatus, a detected value in a sensor included in said image processing apparatus for detecting a state of said image processing apparatus;
- a decision unit for deciding a priority of a plurality of said image processing apparatuses by referring to the respective states of said image processing apparatuses;
- a second acquisition unit for acquiring a position of said image processing apparatus; and
- a third acquisition unit for acquiring a position and an orientation of said portable terminal during shooting with said shooting unit, wherein
- said decision unit decides a priority of a plurality of said image processing apparatuses according to the respective states of said plurality of image processing apparatuses shot with said shooting unit that are specified from a position and an orientation of said portable terminal during shooting and positions of said image processing apparatuses.

8. A display method in a portable terminal in an image processing system including said portable terminal having a shooting unit, a plurality of image processing apparatuses, and a server,
- each of said plurality of image processing apparatuses including a sensor for detecting a state of the image processing apparatus, the display method comprising the steps of:
- detecting, by a detection unit, a position and an orientation of the portable terminal during shooting with said shooting unit;
- acquiring, by a first acquisition unit, each detected value in said sensor as a state of each of said image processing apparatuses;
- acquiring, by a second acquisition unit, a position of each of said image processing apparatuses;
- deciding, by a decision unit, a priority of said plurality of image processing apparatuses according to said state of each image processing apparatus that is specified from a detection result in said detection unit and a position of each of said image processing apparatuses; and
- combining a shot image of an image processing apparatus obtained by shooting with said shooting unit with an image representing said decided priority for that image processing apparatus, and displaying the combined image on said portable terminal.

9. An image forming system comprising:
- a portable terminal including a shooting unit and a display unit;
- a plurality of image processing apparatuses, wherein each of said plurality of image processing apparatuses includes a sensor for detecting a state of the image processing apparatus; and
- a server capable of mutually communicating with said portable terminal, said server including a first acquisition unit for acquiring a detected value in said sensor as information of each of said plurality of image processing apparatuses,
- wherein said server or said portable terminal includes a first processing unit for executing a process of deciding a priority of said plurality of image processing apparatuses by referring to said information of each image processing apparatus,
- wherein said portable terminal includes a second processing unit for executing a process of combining a shot image of an image processing apparatus obtained by shooting with said shooting unit, with an image representing said decided priority for that image processing apparatus, and displaying the combined image on said display unit, and
- wherein said server further includes
  - a receiver for receiving a request from said portable terminal;
  - a determination unit for determining whether the request is to request a state of said image forming apparatus or to request the priority; and
  - a specifying unit for specifying said image processing apparatus in the shooting range,
  - wherein when the determination unit determines the request is to request the priority, the first processing unit executes a process of determining the priority of said specified image forming apparatus, and
  - wherein when the determination unit determines the request is to request the state, the first processing unit executes a process of extracting state information of the specified image processing apparatus and sending the state information to the portable terminal.

10. The image forming system according to claim 9, wherein said determination unit determines the request is to request the priority when a number of the image forming apparatuses is more than a threshold value, and determines the request is to request the state when the number of the image forming apparatuses is lower than the threshold value.

11. An image forming system comprising:
a portable terminal including a shooting unit and a display unit;
a plurality of image processing apparatuses; and
a server capable of mutually communicating with said portable terminal, wherein
each of said plurality of image processing apparatuses includes a sensor for detecting a state of the image processing apparatus,
said server includes a first acquisition unit for acquiring a detected value in said sensor as information of each of said plurality of image processing apparatuses,
said server or said portable terminal includes a first processing unit for executing a process of deciding a priority of said plurality of image processing apparatuses, based on distances between the portable terminal and each of said plurality of image processing apparatuses, by referring to said information of each image processing apparatus, and
said portable terminal includes a second processing unit for executing a process of combining a shot image of an image processing apparatus obtained by shooting with said shooting unit, with an image representing said decided priority for that image processing apparatus, and displaying the combined image on said display unit.

12. The image forming system according to claim 11, wherein said first processing unit decides the priority further based on an abnormal value of said plurality of image processing apparatuses.

13. An image forming system comprising:
a portable terminal including a shooting unit and a display unit;
a plurality of image processing apparatuses; and
a server capable of mutually communicating with said portable terminal, wherein
each of said plurality of image processing apparatuses includes a sensor for detecting a state of the image processing apparatus,
said server includes (i) a first acquisition unit for acquiring a detected value in said sensor as information of each of said plurality of image processing apparatuses and (ii) a receiver for receiving a request for a priority from said portable terminal,
said server or said portable terminal includes a first processing unit for executing a process of deciding the priority of said plurality of image processing apparatuses by referring to said information of each image processing apparatus, said first processing unit decides the priority based on whether an image processing apparatus is present in a shooting range of another portable terminal, different from said portable terminal, which also requests the priority from said server, and
said portable terminal includes a second processing unit for executing a process of combining a shot image of an image processing apparatus obtained by shooting with said shooting unit, with an image representing said decided priority for that image processing apparatus, and displaying the combined image on said display unit.

* * * * *